(12) United States Patent
Serre et al.

(10) Patent No.: US 10,022,862 B2
(45) Date of Patent: *Jul. 17, 2018

(54) CONTROL-COMMAND ARCHITECTURE FOR A MOBILE ROBOT USING ARTICULATED LIMBS

(71) Applicant: Aldebaran Robotics, Paris (FR)

(72) Inventors: Julien Serre, Viroflay (FR); Brice Marnier, Paris (FR); Jerome Matard, Paris (FR)

(73) Assignee: Alderbaran Robotics, Paris (FR)

( * ) Notice: Subject to any disclaimer, the term of this patent is extended or adjusted under 35 U.S.C. 154(b) by 5 days.

This patent is subject to a terminal disclaimer.

(21) Appl. No.: 15/082,700

(22) Filed: Mar. 28, 2016

(65) Prior Publication Data

US 2016/0311109 A1 Oct. 27, 2016

Related U.S. Application Data

(63) Continuation of application No. 12/736,456, filed as application No. PCT/EP2009/054117 on Apr. 8, 2009, now Pat. No. 9,327,400.

(51) Int. Cl.
*B25J 9/16* (2006.01)
*G06N 3/00* (2006.01)
*G05B 19/414* (2006.01)
*G06F 11/10* (2006.01)

(52) U.S. Cl.
CPC .......... *B25J 9/161* (2013.01); *G05B 19/4141* (2013.01); *G05B 19/4148* (2013.01); *G06N 3/008* (2013.01); *G05B 2219/33212* (2013.01); *G05B 2219/40304* (2013.01); *G06F 11/1004* (2013.01)

(58) Field of Classification Search
CPC ..... B25J 9/1602; B25J 9/161; G05B 19/4148; G05B 2219/33277; G05B 19/0421
See application file for complete search history.

(56) References Cited

U.S. PATENT DOCUMENTS

| | | | | |
|---|---|---|---|---|
| 5,917,840 A | * | 6/1999 | Cheney | H04L 1/0061 714/758 |
| 2003/0230998 A1 | * | 12/2003 | Miyaji | G05B 19/4148 318/625 |
| 2004/0015598 A1 | * | 1/2004 | Lin | H04L 49/90 709/232 |
| 2004/0133308 A1 | * | 7/2004 | Kato | G06N 3/008 700/245 |

(Continued)

*Primary Examiner* — Dale Moyer
(74) *Attorney, Agent, or Firm* — Locke Lord LLP; Scott D. Wofsy

(57) ABSTRACT

The present invention applies to a mobile robot which can have a human appearance and sophisticated functions enabling it to execute missions. To enable communications internal to the robot to be optimized and allow for a versatility that is both physical (possible substitution of parts of the robot) and software (replacement of programs to adapt it to new missions), an architecture with three computer levels is provided. The highest level comprises the intelligence of the robot which generates commands which are transmitted by an intermediate computer to low-level cards which control the sensors and actuators. Communication between the intermediate computer and the low-level cards is managed by at least one specific secure communication protocol.

21 Claims, 12 Drawing Sheets

(56) References Cited

U.S. PATENT DOCUMENTS

2006/0214621 A1* 9/2006 Ogawa ............... B25J 9/1674
  318/568.12
2007/0010898 A1* 1/2007 Hosek ............... G05B 19/4148
  700/2
2008/0150713 A1* 6/2008 Kalhoff ............... H04L 12/403
  340/532

* cited by examiner

CONTROL-COMMAND ARCHITECTURE FOR A MOBILE ROBOT USING ARTICULATED LIMBS

The present invention belongs to the field of control and command systems embedded on robots. More specifically, it applies to the architecture of robots which move on or use articulated limbs, notably of human or animal form. A robot may be qualified as humanoid from the moment when it has certain human appearance attributes: a head, a trunk, two arms, two hands, two legs, two feet, etc. A humanoid robot may, however, be more or less advanced. Its limbs may have a greater or lesser number of articulations. It may manage its balance itself statically and dynamically and walk on two limbs, possibly in three dimensions. It can pick up signals from the environment ("hear", "see", "touch", "feel", etc.) and react according to more or less sophisticated behaviors, and interact with other robots or humans, either by speech or by action. The more a robot is to be given a human appearance and behavior, the more necessary it will be to give it degrees of freedom under stress at the articulations of the limbs (therefore to multiply the motors driving these articulations), to multiply the sensors and the processing operations, and to generate reflex reactions. The more it is to be adapted to missions defined by users (humans, themselves), the more necessary it will be to provide the possibility of customizing the physical structure of the robot (by, for example, replacing one head with another) and its intelligence (by updating the programs from which it is formed, which may entail interactions with a server from which it can download the new applications upgrading its missions or its behaviors). This increase in complexity and this versatility of the physical and software structures of mobile robots on articulated limbs cannot be implemented in the architectures of the prior art. This is because a control-command architecture comprising a single central computation unit driving all the motors controlling the articulations rapidly reaches its limits, notably because of the weight of the associated connectors. An alternative is to provide a decentralized architecture, conventional in industrial robotics systems, with a mother card and a controller card for each motor unit or sensor. In the case of a humanoid robot that has the functions indicated, the management of the communications to/from the mother card then becomes very taxiing for its processor, until it is saturated.

The present invention resolves this problem by providing a control-command architecture with at least three levels, a level for commanding the sensors/actuators via an electronic card provided with at least one microcontroller, a level for translating and transmitting commands to said cards and directly driving basic functions, and a level for generating higher level functions including the artificial intelligence of the robot.

To this end, the present invention discloses a mobile robot on articulated limbs comprising a plurality of subsets of sensors and actuators, each subset being controlled by an electronic card, characterized in that the control functions for at least some of the electronic cards are distributed between at least a first computer and a second computer, said first computer notably handling the transmission to said electronic cards of command messages for executing functions defined by the second computer.

Advantageously, certain functions of the mobile robot are programmed in the first computer, said functions managing the reflexes of the robot by determining commands for the actuators according to values of certain sensor state variables.

Advantageously, certain configuration data of the mobile robot are stored in a memory managed by the first computer, said configuration data notably comprising the list of the electronic cards controlled, the sensors and actuators commanded by said cards and operating parameters of said sensors and actuators.

Advantageously, the first computer manages the initialization procedure for at least some of the electronic cards of the robot.

Advantageously, electronic cards of the robot can be replaced by equivalent cards without modifying the programming of either the first computer or the second computer.

Advantageously, the second computer may be replaced by another equivalent computer without modifying the programming of the first computer.

Advantageously, the communications between the first computer and the electronic cards are managed by a secure protocol on at least one specific bus, said secure protocol including frames comprising, before the bytes of the message, a byte containing at least the destination address and a most significant bit with a chosen value, and after the bytes of the message, at least one byte containing the size of the message and one byte containing a CRC.

Advantageously, all the bytes of the frame according to said secure protocol have a first bit at the value complementing the most significant bit of the address byte and the first byte in every seven bytes contains the seven most significant bits of the next seven bytes.

Advantageously, said secure protocol includes a simulcast communication mode.

Advantageously, the first computer and the electronic cards that it controls are also connected by at least two communication lines, one of which is used to detect operation and the other to assign addresses to said electronic cards.

The present invention also discloses a method for controlling a mobile robot on articulated limbs comprising a plurality of command steps for subsets of sensors and actuators, each subset being commanded by an electronic card, characterized in that the control steps for at least some of the electronic cards are distributed between at least a first computer and a second computer, said first computer notably handling the step for transmission to said electronic cards of command messages for executing functions for which the definition step is performed by the second computer.

Advantageously, the communications between the first computer and the electronic cards are managed by a secure protocol on at least one specific bus, said secure protocol including frames comprising, before the bytes of the message, a byte containing at least the destination address and a most significant bit with a chosen value, and, after the bytes of the message, at least one byte containing the size of the message and one byte containing a CRC, and all the bytes of the frame according to said secure protocol also have a first bit at the value complementing the most significant bit of the address byte and the first byte of every seven bytes contains the seven most significant bits of the next seven bytes.

Advantageously, the command messages are transmitted to the electronic cards with a period that is substantially fixed whose order of magnitude is around ten milliseconds.

Advantageously, the command messages generated by the second computer include at least one execution date for each command.

Advantageously, the time-stamped command values are calculated by interpolation with the periodic sending dates between the values just before and the values just after.

Advantageously, the servo-control instructions executed by an electronic card between a first command and a second command are extrapolated from the preceding commands by extending the command speed variation between the command preceding the first command and said first command.

Advantageously, the servo-control instructions executed by an electronic card between a first command and a second command are extrapolated from the preceding commands by translating the command speed variation between the command preceding the first command and said first command to the servo-control instruction applied between the first and the second commands.

This architecture presents the advantage of freeing up most of the computation power of the highest-level unit for the artificial intelligence tasks which handle the generation of behaviors of the robot suited to the usage profiles of said robot. It also makes it possible to manage the communications between the various computers on different buses, optimized by level, and to provide communication protocols that have also been optimized. Furthermore, this architecture presents the additional advantage that parts of the robot can be changed without reconfiguring the core of the robot. It is also optimum for the use of time-stamped commands which are necessary to synchronize the execution of the orders transmitted to the many articulations of a humanoid robot, possibly from a remote machine or from another robot in communication with the first robot via an asynchronous link.

The invention will better understood and its various features and advantages will emerge from the following description of a number of exemplary embodiments and its appended figures in which.

Hereinafter in the description, the abbreviations and acronyms have the meanings indicated in the table below, unless a different meaning is explicitly given for them in a particular context:

| Abbreviation/acronym | Meaning |
| --- | --- |
| ACK | Acknowledge(ment) |
| AI | Artificial Intelligence |
| BID | Broadcast Identification Number |
| CPU | Central Processing Unit |
| CRC | Cyclic Redundancy Check |
| DCM | Device Communication Manager |
| DSP | Digital Signal Processor |
| FSR | Force Sensing Resistor (pressure sensor under the feet) |
| I2C | Inter-Integrated Circuit Bus |
| LED | Light Emitting Diode |
| LSB | Least Significant bit |
| MCU | Micro Controller Unit |
| MSB | Most Significant bit |
| MRE | Magnetic Rotary Encoder |
| NACK | Non-Reception Acknowledgement(s) |
| OS | Operating System |
| STM | Short Term Memory |
| PC | Personal Computer |
| RAM | Random Access Memory |
| USB | Universal Serial Bus |
| VPN | Virtual Private Network |

Figure 1:
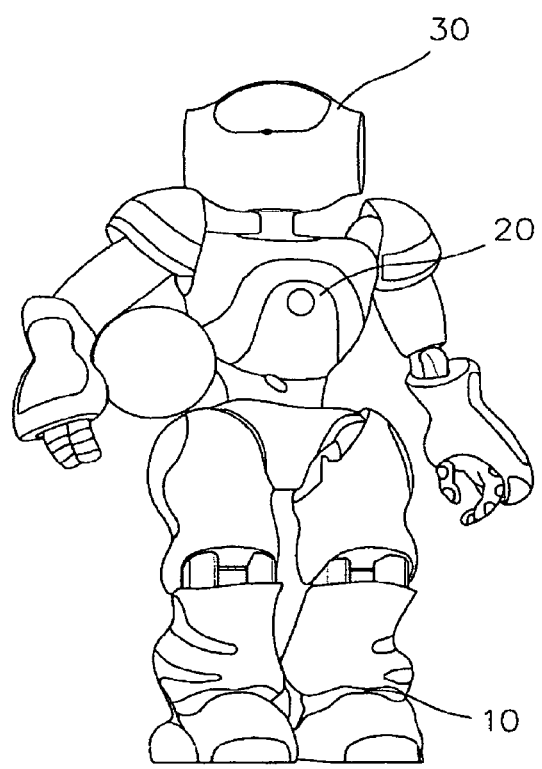
FIG. 1 is a diagram of the physical architecture of a humanoid robot in an embodiment of the invention.

FIG. 1 illustrates the physical architecture of a humanoid robot in an embodiment of the invention. This robot comprises approximately two dozen electronic cards of type 10 for controlling sensors 120 and actuators 130 which drive the articulations. The card 10 shown in the figure is the one controlling the left foot. One of the virtues of the architecture is that the cards controlling the articulations are mostly interchangeable. An articulation normally has at least two degrees of freedom and therefore two motors. Each motor is driven angle-wise. The articulation also comprises a number of position sensors, notably MREs (Magnetic Rotary Encoders). The control electronic card comprises a market-standard microcontroller 110. This may be, for example, a DSPIC™ made by the company Microchip. This is a 16-bit MCU coupled to a DSP. This MCU has a looped servo-control cycle of 1 ms. The robot may also include other types of actuators, notably LEDs 140 (light emitting diodes), the color and the intensity of which may reflect the emotions of the robot. The latter may also include other types of position sensors, notably an inertial unit, FSRs (pressure sensors on the ground), etc.

The head contains the intelligence of the robot, notably the card 30 which executes the high-level functions which enable the robot to accomplish the missions that are assigned to it. The card 30 could, however, be located elsewhere in the robot, for example in the trunk. It will be seen, however, that the location, when the head is removable, makes it possible to replace these high-level functions and therefore notably to completely change the intelligence of the robot and therefore its missions very rapidly, or, conversely, to change one body for another (for example a defective body with one that is non-defective) while keeping the same artificial intelligence. The head may also include dedicated cards, notably dedicated to speech or vision processing. The processor 310 of the card 30 may be a market-standard x86 processor. Preference will be given to choosing a low-consumption processor such as the Geode™ made by the company AMD (32 bits, 500 MHz). The card also includes a set of RAM and flash memories. This card also manages the communications between the robot and the outside world (behavior server, other robots, etc.), normally over a WiFi or WiMax transmission layer, possibly over a public mobile data communication network with standard protocols possibly encapsulated in a VPN. The processor 310 is normally driven by a standard OS which makes it possible to use the usual high-level languages (C, C++, Python, Ruby, etc.) or the languages specific to artificial intelligence like URBI (programming language specializing in robotics) for programming the high-level functions.

A card 20 is housed in the trunk of the robot. That is where the computer is located which, according to the invention, handles the transmission to the cards 10 of the orders calculated by the card 30. This card could be housed elsewhere in the robot. However, the location in the trunk is advantageous because it is located close to the head and at the point where the four limbs cross, which therefore makes it possible to minimize the connectors linking this card 30 to the card 20 and to the cards 10. The computer 210 of this card 20 is also a market-standard processor. This may advantageously be a 32-bit processor of the ARM 7™ type with a clock speed of 60 MHz. The type of the processor, its central position, close to the on/off button, and its link to the control of the power supply make it a tool well suited to managing the power supply of the robot (stand by mode, emergency stop, etc.). The card also includes a set of RAM and flash memories.

Figure 2:
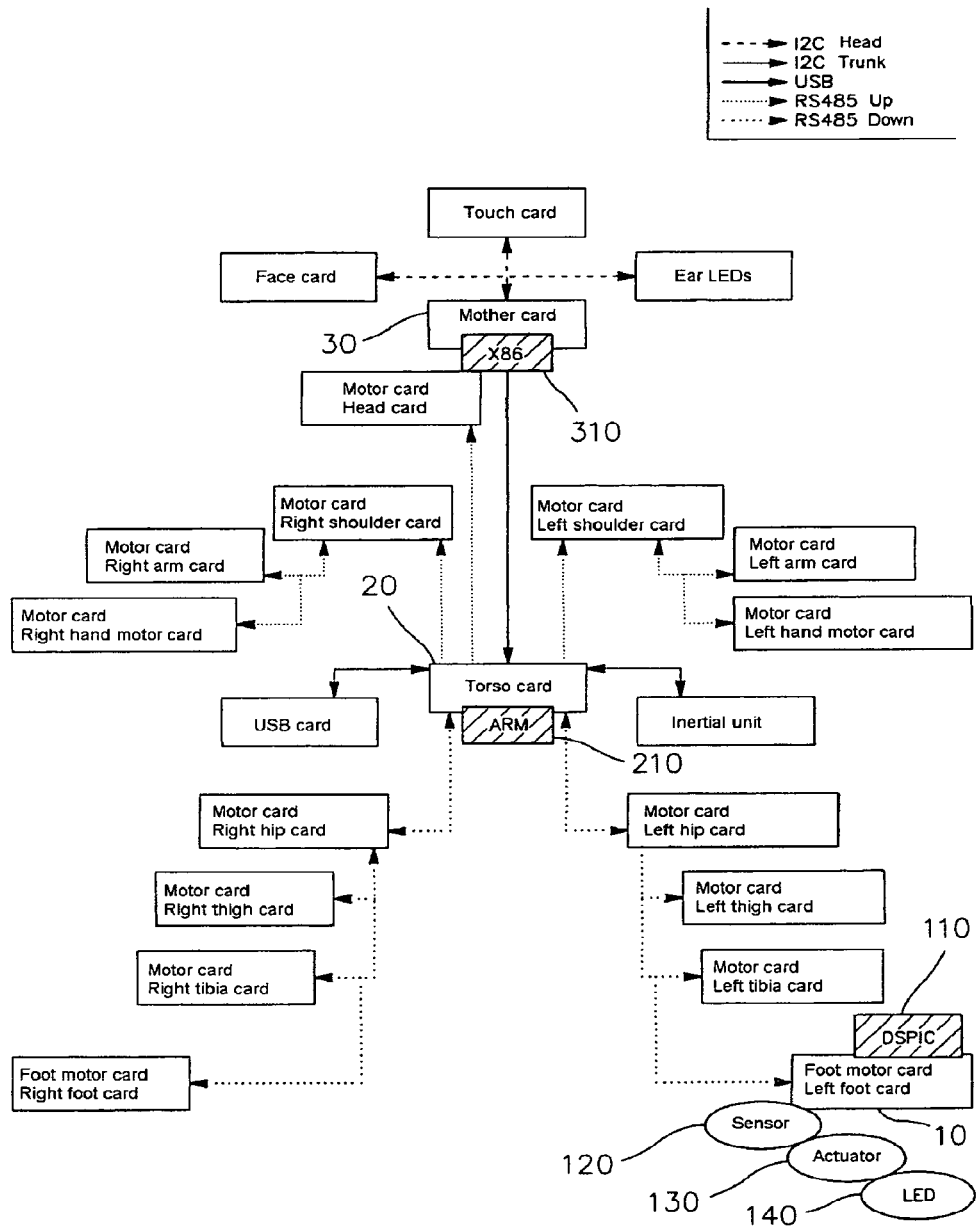
FIG. 2 is a diagram of the functional architecture of a humanoid robot in an embodiment of the invention.

In this three-level architecture according to the invention, a function for reprogramming the microcontrollers 110 and 210 is provided in the mother card. FIG. 2 illustrates the main function of the computer 210 which is to handle the transmission of the orders generated by the computer 310 to the cards 10 notably comprising sensors 120 and actuators (for example motors 130 and possibly LEDs 140). Some orders may be transmitted directly to certain cards without passing through the card 20. Such is notably the case for the cards located in the head which have no motor (cards handling the control of the LEDs of the face, detection of touch and LEDs of the ears). The link between these cards and the card 30 is advantageously provided by an I2C bus, which is effective for the signal frames that use it. The card 20 is linked to the card 30 via a USB bus which has sufficient reliability and speed for this function, and which uses very little power on the processor. Furthermore, this USB link makes it possible, when the head containing the card 30 in one embodiment is removed, to directly connect the other elements of the computation architecture to an external computer for development and test purposes.

A USB protocol suited to this application is described briefly hereinbelow. The structure of the message is conventional: a header comprising a fixed first byte, a second type byte, an address byte, a message-length byte, the bytes of the message (up to 128 bytes) and two fixed end-of-message bytes, the first of which is identical to the first header byte. The bytes of the message which are equal to the first header byte are systematically duplicated to polarize the receiver. One specific feature of the protocol used is the management of the positive and negative receipt acknowledgements (ACK and NACK) when reading and writing. In both cases, if the operation is successful (ACK), the message includes, in the "data" field, the data that have been read or written. If the operation fails (NACK), the "data" field contains a specific sequence.

The card 20 communicates with the cards 10 located in the top limbs and the bottom limbs via two links, for example of the RS485 type. Each RS485 link is complemented by a debugging line to which are linked all the cards 10 and the card 20 and a chaining line for each member which passes from the first card 10 of a limb to the next, starting from the card 20. The function of these lines is explained later in the description.

The RS485 links are very widely used in industrial environments and are suited to use for the command and control of a humanoid robot because of their very low sensitivity to interference. Furthermore, they have a data rate above 46 600 bytes per second which is necessary for exchanging large quantities of information in both directions. They do, however, present the drawback that the message frames are sent continuously over the link which makes the decoding of the messages more difficult. It is therefore necessary to use a secure communication protocol that makes it possible to retrieve the various messages from the frames. One possible protocol is described hereinbelow. It mainly consists in setting to zero the first bit of each byte and in inserting, before seven bytes, a byte comprising the most significant bits of the next seven bytes. Moreover, the message header is made up of a byte containing the destination address on six bits, a bit that indicates whether it is a read or write that is being done, and a most significant bit that is systematically at 1. The start of the message comprises two bytes in addition to the address, the first encoding the size of the message and the second the type of message, and the last byte of the message consists of a CRC relating to all of the message. The messages may be of the type: angle of an articulation, viscosity of an articulation, reset, LEDs, configure device, various reprogramming commands etc. For a message to be valid, it must therefore observe the following criteria: 1st MSB at 1, the other at 0, address, message type, size and CRC correct. The protocol's management load is fairly light both in transmission and in reception. The message is of fixed size, which greatly facilitates the time management of the communication.

To lighten the load associated with the check codes, fairly wide use is made of a broadcast function, in reality most often a simulcast function, or simultaneous transmission to different addresses. In this case, the 1st destination address is set to zero. The destination cards for a portion of the message are identified by a BID, or Broadcast ID, which enables each card to retrieve the portion of the message that is intended for it. This embodiment makes it possible in particular to send commands to the actuators, such as the positions of the articulations to be reached.

For the reading of the motor cards, the protocol is slightly different: the master sends the 1st byte (always with the MSB at 1) followed by the number of bytes to be requested on 7 bits and a 7-bit CRC for these two bytes. The card designated by the address responds only if the CRC is correct. It then responds with the number of bytes requested with the MSB always at 0. The data read on the motor cards depend on the length requested, the starting point always being the same. The most useful and most frequently read data are placed at the start of the area to be read. These are positions of the sensors of the articulations, current, errors and temperature. At the level of the chest card 20, there is no byte count. There is only a time-out corresponding to the time to send response bytes with a margin. After the time-out, the card may or may not have received the bytes, which makes it possible not to disrupt the operation of the rest of the robot should a card fail. The debugging and chaining links are used mainly when the robot is initialized, the management of which is also handled by the card 20, which is another of its important functions. The card 20 is controlled by the on button and is initialized first. The cards 10 and the card 30 then start up; the cards 10 send, over the debugging line, a bit at 0; the card 20 returns a command to them over the chaining line which changes this status bit to 1. The addresses are then assigned by increment by one unit step by step for each of the cards on each chaining line, until the last card of the limb. It is therefore the position of the cards 10 in the chain which creates a "physical" differentiation between them when they are identical. In the case of a reset, all of the chaining is replayed. The debugging and chaining lines are, for example, lines that use the One Wire protocol on which circulate square pulse chains which code 0 bits (low-state pulse duration of the order of 50 μs) and 1 bit (low-state pulse duration of the order of 250 μs).

Figure 3:
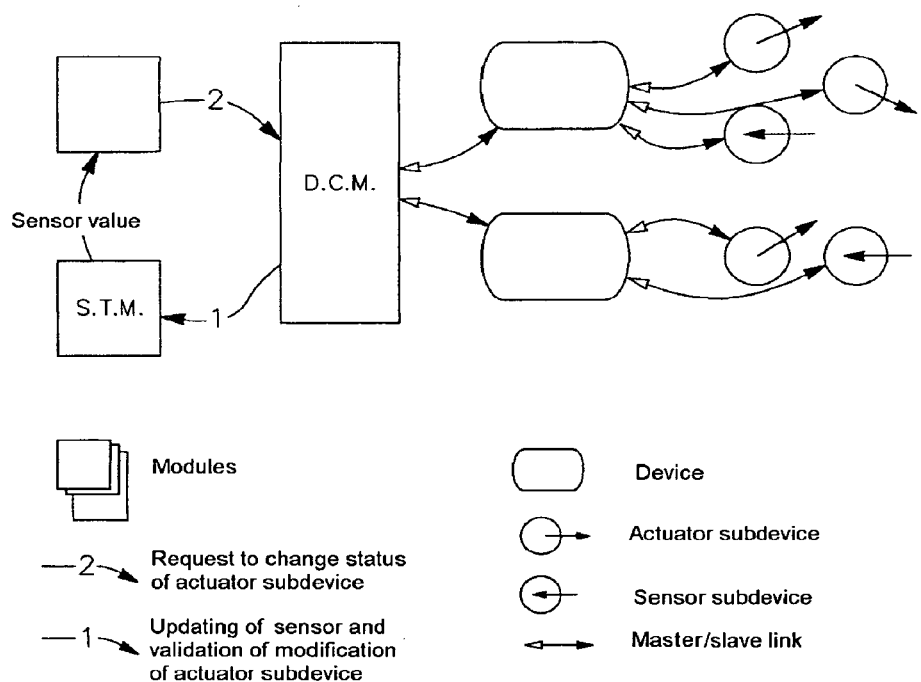
FIG. 3 is a schematic of the logical architecture of a humanoid robot in an embodiment of the invention.

FIG. 3 illustrates the logical architecture of a humanoid robot according to the invention.

The robot comprises a card management module (DCM) which may be implanted mainly on the card 30 but also at least partially on the card 20. The DCM program begins by reading a configuration buffer internal to each card 10 (for example, a motor card). This buffer at this stage contains only indications internal to the card (versions of the boot loader—automatic loader for the starter file, for the program, and for the card; address of the card obtained by the chain). The buffer is complemented in the DCM by all the configuration values: BID, number and position of MREs in the chain, number and position of motors, articulation servo-control coefficient, presence of LEDs, or of FSRs, etc. The buffer is then sent once again to the card 10. This update of the configuration parameters of the cards 10 advantageously replaces an update of the flash memory of the cards. The data read on the cards 10 are stored in a database internal to the robot (STM) kept in RAM. The logical architecture of the robot breaks down into a type of master peripheral devices called Devices hereinafter in the description (essentially, MCU 110 for the electronic cards 10 of the robot), then into slave peripheral devices, called SubDevices (sensors 120 or actuators 130, 140) linked to the Device. The Devices are in turn slaves relative to the set of cards 20, 30. They are characterized by a type, a bus (head or chest I2C, up or down RS485) and an address on this bus. The SubDevices are characterized by a type (motors, LEDs, FSRs, etc.) which define whether they are sensor or actuator, the attachment Device and the SubDevice number.

It should be noted that the position of the articulation corresponds to a sensor SubDevice (corresponding to the angular information returned by the sensor) and to an actuator SubDevice separate from the first, corresponding to the requested position to be reached.

For example, a motor card preferably comprises two motor SubDevices (actuator), 2 sensor position SubDevices (sensor), 2 current SubDevices (sensor), etc. The face card may include a large number of LED SubDevices (actuator) (48 in one embodiment).

A SubDevice is also characterized by the floating point value of its main state variable (the angular position of the articulation for a position sensor, the current measurement for the current sensor, the value of the LED for the LED actuator, and so on), and by the values of variables derived from the main variable (gain, offset, minimum and maximum values, acknowledgement (ACK) or non-reception acknowledgement (NACK), ERROR—different from 0 in case of problems). The Devices have no main state variable value, but they have counter values of the ACK/NACK/ERROR type. Other values are specific to the types of Devices or SubDevices (for example, the servo-control coefficients on the motor actuators). All these values are updated automatically and can be seen in the STM from the high-level applications. The ACK and NACK counters are respectively incremented on each successful communication or on each communication error with the Device/SubDevice. They make it possible to detect problems accessing the card and to calculate their frequency.

This Device/SubDevice architecture is described for each robot in a configuration file that is present by default (standard configuration) in the card 30 and can easily be modified, but certain specific values are also stored in a flash memory of the card 20. This is another important function of this card 20 which thus makes it possible to preserve the independence between the high level and the low level of the robot. The DCM does not itself have any "hard" information concerning the electronic architecture of the robot. Access to the sensors and actuators is obtained by a "key" bearing the name of the SubDevice/value. For the high level, there is no difference between the LEDs of the feet (managed in RS485 mode on a motor card via the USB of the chest card), the LEDs of the chest (managed by the chest card via USB requests), and the LEDs of the face (managed by the face card via I2C requests).

In a preferred embodiment, the DCM operates with an internal cycle of 10 to 20 ms. Most of the sensors and actuators are updated/read systematically on each cycle. This makes it possible to operate at constant load, to optimize communications, to make a communication error non-critical (it "lasts" only 20 ms). Furthermore, by preferring a systematic update of most of the sensors over a request-based update, an immediate availability of the up-to-date information for all the high-level modules of the robot is assured. The card 20 handles the conversion of the commands generated by the DCM and transmitted in a USB protocol into the RS485 protocol. It is possible also to use one of the memories of the card 20 as a buffer memory for these commands, so as to perform interpolation calculations between commands as indicated below.

Figure 4:
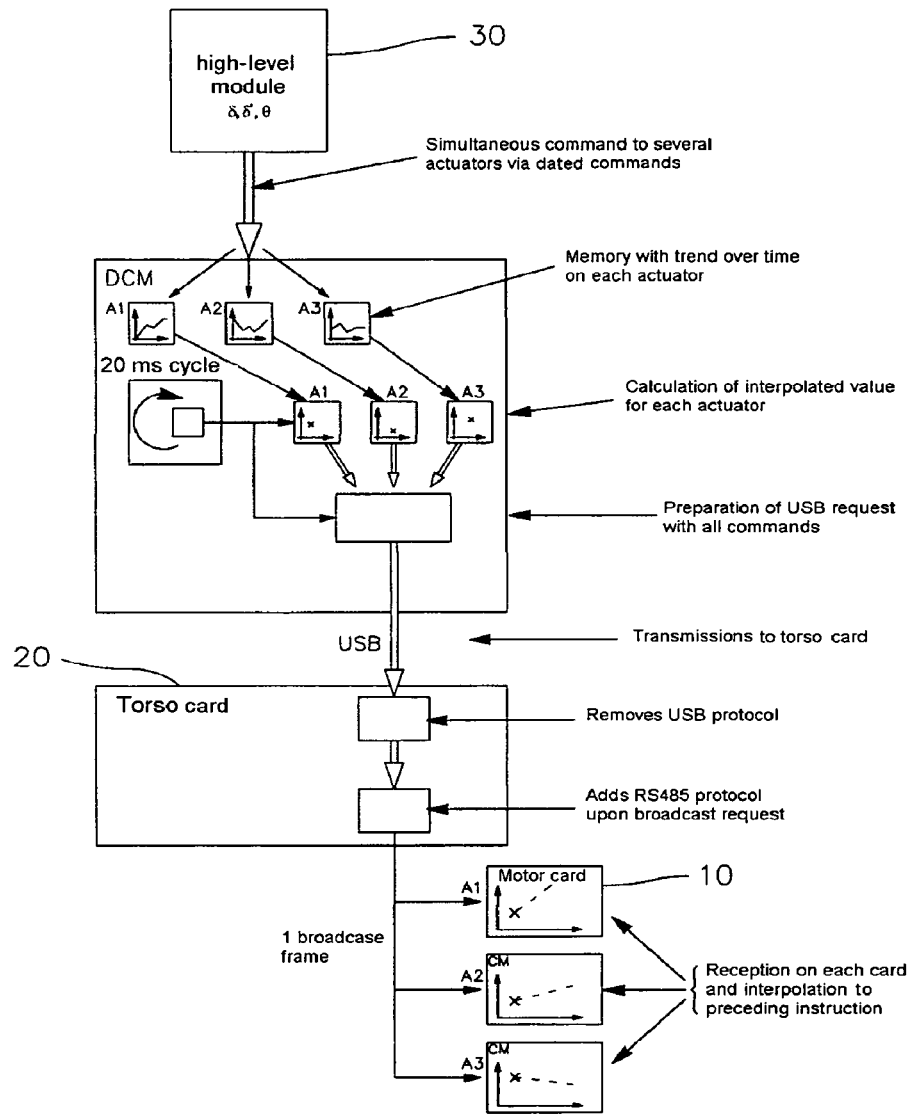
FIG. 4 is a diagram illustrating the transmission by the first computer of commands generated by the second computer to the electronic cards in a humanoid robot in an embodiment of the invention.

As an example of the operation of the architecture according to the invention, FIG. 4 illustrates the generation and transmission of a set of commands for the robot to advance by a distance δ along a heading θ at a speed δ'. The processor 30 generates the commands to be applied to the motors of the articulations $A_1, A_2, A_3$ of the robot to execute the order δ, δ', θ. For each articulation, there are one or more commands in the form of angles to be reached. In a preferred embodiment of the invention, for all the commands to be executed, the absolute time of execution is calculated. In this nondeterministic processor and bus architecture, neither the communications between cards of the robot nor the communications from outside, that can supply parameters as input for the instruction to be executed, can have a guaranteed time of travel to the place of their execution and therefore certain arrival and execution times. The time-stamping of the commands makes it possible to ensure their synchronization in this context in a relatively simple way. It is possible, for example, to use the system time of the processor 30. Based on the configuration information and the known system status, the DCM generates a series of values for the stress variable a (angle command) for the actuators $A_i$ at a series of instants t in the future, $\{\alpha_{i,t}\}$. The duration T over which it is possible to calculate and transmit the values α depends notably on the memory capacity of the DCM's dedicated RAM. In as much as the DCM has its own cycle (10 to 20 ms as already indicated), it is necessary to generate actual commands at the moment when the frames are transmitted. For all the commands applied to actuators whose state variables are continuous (such as the angle which characterizes the rotation of an articulation motor or the luminescence of an LED), this generation is applied at the instant t by searching for the commands $\alpha_{i,t1}$ and $\alpha_{i,t2}$ which are respectively just before t and just after t, and by performing a linear interpolation between these two values, weighted by the time elapsed between t1, t2 and t.

For the sending of new commands, it is also possible to merge two series $\{\alpha_t\}$ relating to one and the same actuator, the one in the DCM's RAM and a new one sent by an external module. This operation is carried out before interpolation. The result of the interpolation is encapsulated in USB frames then transmitted from the card 30 to the card 20. As a variant, it is also possible to transmit the series $\{\alpha_{i,t}\}$ and perform the transformations in the card 20. In both cases, the processor 210 then handles the elimination of the USB protocol and the encapsulation in RS485 frames according to the secure protocol described above. Preference is given to using the simulcast mode, by coding the addresses of the Devices containing the SubDevices that have to execute the commands. The frames are then transmitted simultaneously over the RS485 bus to the Devices controlling the SubDevices $A_i$ that have to execute commands. The frame control procedure makes it possible to check the integrity of the messages transmitted. An interpolation is done on the Devices between the first command to be executed and the last one executed previously so as to smooth the movements of the articulations.

Figure 5A:
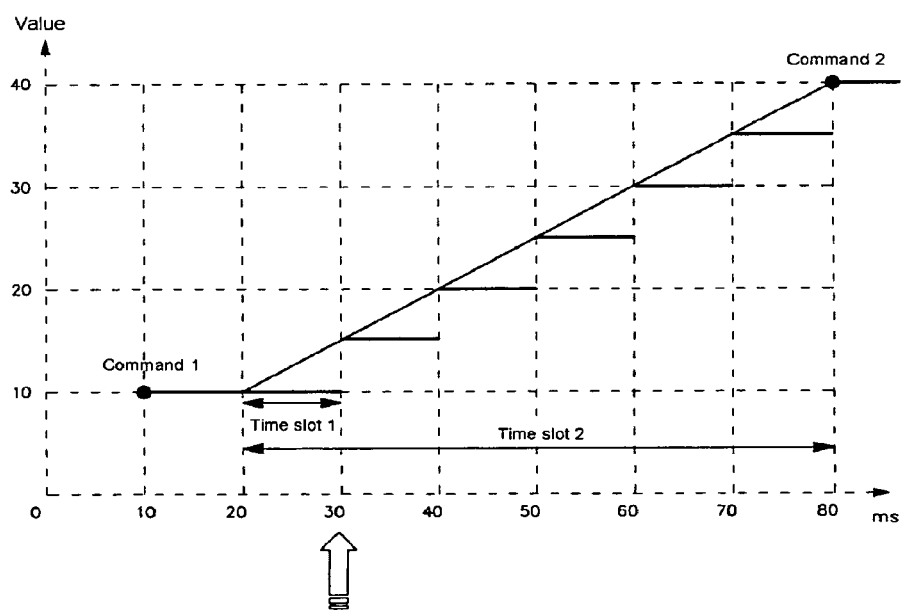
FIGS. 5A and 5B are timing diagrams illustrating the generation of time-stamped commands by one of the first- or second-level computers for transmission to the lowest-level electronic cards in a humanoid robot in an embodiment of the invention.
Figure 5B:
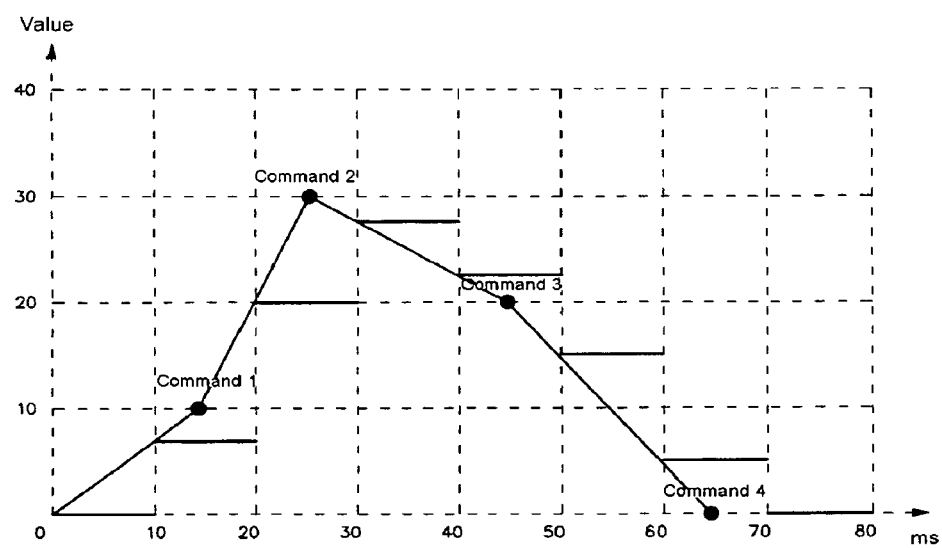

Transformations based on linear interpolation applied to the transmission are illustrated by FIGS. 5A and 5B. In the simple case of FIG. 5A, 7 commands at 10 ms intervals progressively replace two commands at 70 ms intervals. The values of the commands evolve without difficulty monotonically. In the more complex case of FIG. 5B in which there is a change of direction of variation of the state variable, the staircase interpolation function makes it possible to reconstruct this change in a smoother manner.

Figure 6A:
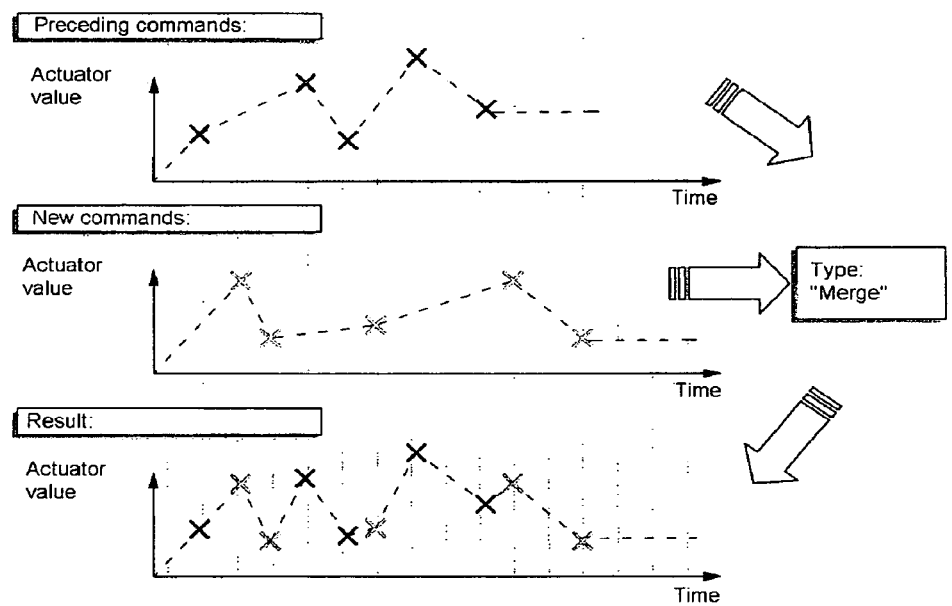
FIGS. 6A, 6B, 6C and 6D are timing diagrams illustrating various scenarios for merging time-stamped commands in an embodiment of the invention.
Figure 6B:
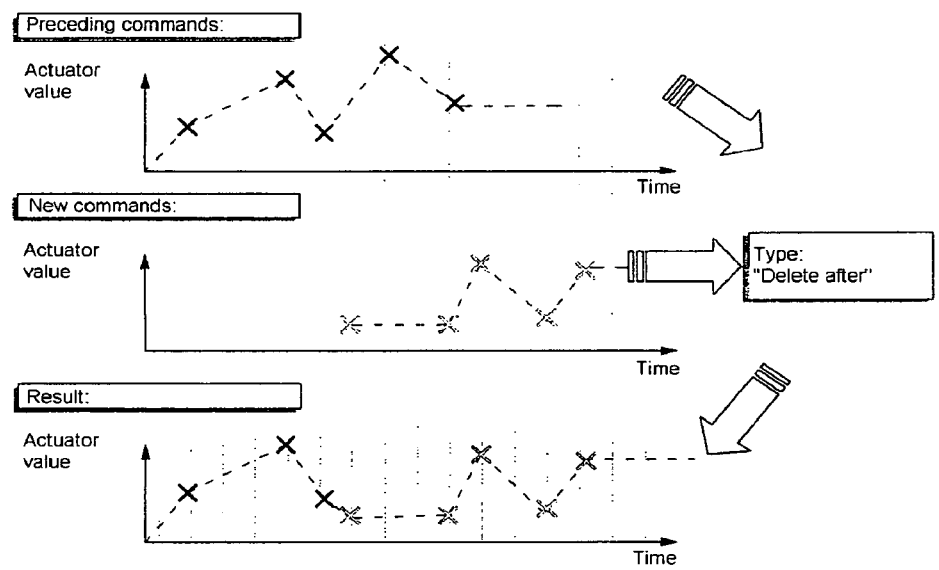
Figure 6C:
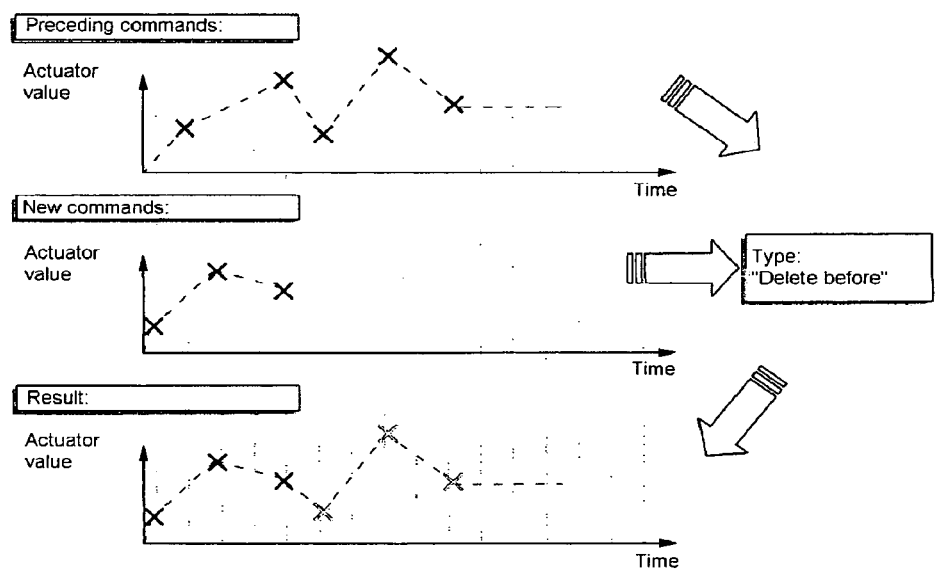
Figure 6D:
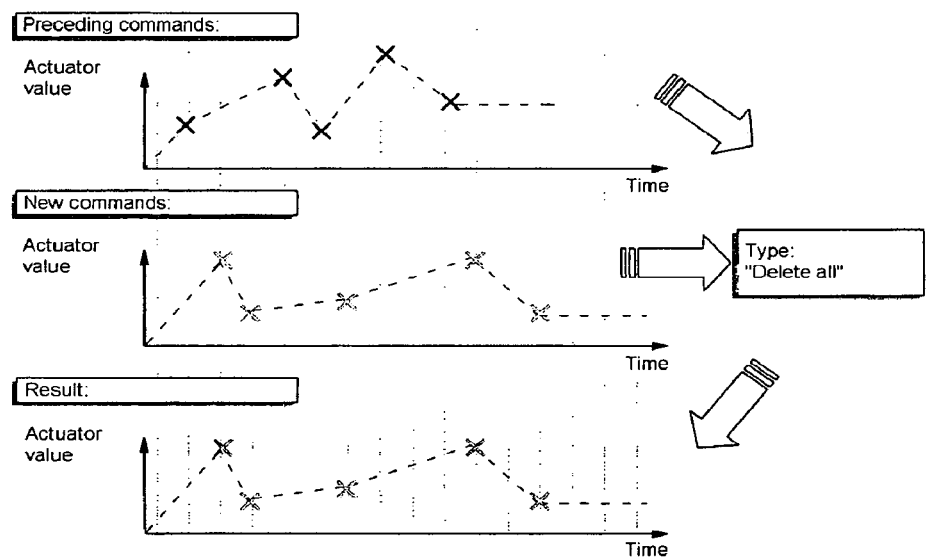

Various types of merge transformations based on command frames are illustrated by FIGS. 6A, 6B, 6C and 6D. In the case of FIG. 6A, the merging consists in taking into account all the commands. In the case of FIG. 6B, the oldest command is erased after a given time. In the case of FIG. 6C, the oldest command is erased before a given time. In the case of FIG. 6D, the oldest command is completely erased.

Figure 7A:
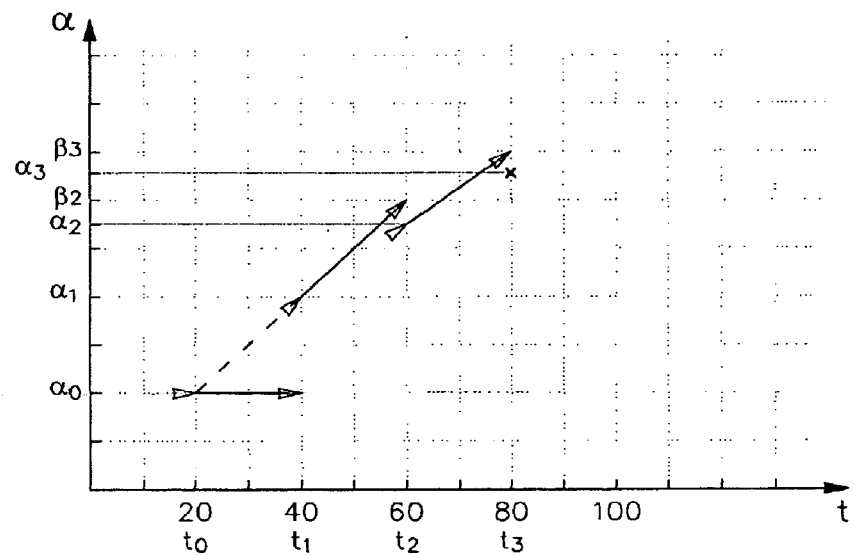
FIGS. 7a and 7b illustrate the distribution of the configuration elements between the various levels of the architecture of a humanoid robot in the embodiment of the invention.
Figure 7B:
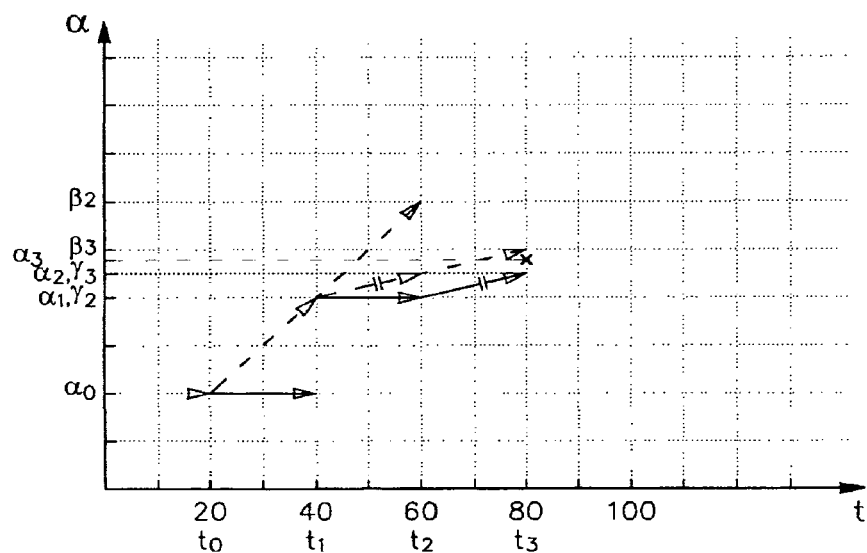

It is also advantageous to smooth the execution of the commands received by an actuator so as to avoid, as far as possible, any discontinuities. To do this, various extrapolation algorithms are possible. Two of them are illustrated by FIGS. 7A and 7B. It will firstly be recalled that the reception cycle for the commands is of the order of around ten ms (20 ms in a current preferred embodiment) and that it is almost constant given no network or processor load contention, whereas the servo-control cycle is of the order of one ms. In the case of FIG. 7A, it is considered that the speed of change of the command $a_t$, as measured over the period $t_0$, $t_1$, ($\alpha'_{t_1} = (\alpha_{t_1} - \alpha_{t_0})/(t_1 - t_0)$) is constant over the next time slot $t_1$, $t_2$. Servo-controlling to an extrapolated instruction ($\forall\, \theta \in [t_1, t_2]$, $\alpha_\theta = \alpha_{t_0} + \alpha'_{t_1} * (\theta - t_0)$) (makes it possible to reach a command $\beta_2$ at $t_1$ whereas, failing this, the servo-control instruction would change abruptly from $\alpha_1$ to $\alpha_2$. It can be seen, graphically, that if the instruction remains at constant speed, accelerates or decelerates slightly, servo-controlling to an interpolated instruction in this way is more effective than maintaining the preceding instruction, since the difference $\beta_2 - \alpha_2$ is smaller than the difference $\alpha_2 - \alpha_1$. It will be noted that, in this case, the servo-control effectively produced goes from $\beta_2$ to $\beta_3$, $\beta_3$ corresponding to the instruction extrapolated between $(\alpha_1, t_1)$ and $(\alpha_2, t_2)$.

This condition is not satisfied if the instruction decelerates very rapidly: in this case, the difference $\beta_2 - \alpha_2$ is greater than the difference $\alpha_2 - \alpha_1$. The trend of the instruction is given by solid lines. FIG. 7B illustrates this second type of significant deceleration situation and another method for calculating the trend of the instruction is applied to it, which consists in introducing a delay effect of one cycle: $\gamma_2$ is the translation of $\alpha_2$ of a cycle. It can be seen graphically that, thus, $\gamma_2$ is closer to $\alpha_2$ than the result of the preceding calculation would be. On the other hand, on the next cycle, the difference is reversed, but the sum of the two remains favorable. It is, furthermore, useful to introduce a certain number of behavior rules to regulate the trend of the instructions in particular cases: if an extrapolation algorithm cannot work, the instruction is left unchanged; if no command is received for a chosen time—for example, for a cycle of 20 ms, 50 ms—no extrapolation is applied, leaving the instruction at the value reached last; at the end of another chosen time, for example 10 times the time chosen in the preceding case, the robot is stopped; the actuator is never, however, switched off, preference being given to applying an electromagnetic braking instruction to avoid having the robot or one of its articulations fall abruptly.

The advantages of a system of time-stamped commands as described hereinabove are many:
 by default, it avoids abrupt discontinuities, even if the latter remain possible in case of need with two commands with very close times;
 it allows a single command to make a linear interpolation between two values which is a simple interpolation, but still a valid one (the other interpolations can be reduced to a series of linear interpolations, and therefore the commands in more complex cases can be minimized);
 it makes it possible to avoid the problems of synchronization between the DCM (which has its own cycle) and the other modules; it is sufficient, for example, to give the commands at least one cycle in advance to the DCM for it to calculate an interpolation corresponding to the instruction, which does not generate jerks in the movements;
 it provides an accuracy in the instructions, and therefore the movements, which is excellent;
 it is insensitive to any delays, latencies or variable communication times;
 it makes it possible to very simply synchronize several actuators, even if they are controlled by totally different modules, located or not located in the robot.

Furthermore, the external modules can recover the system clock in a simple manner, and therefore be synchronized with the command generator.

To reduce the computation load of the DCM, the commands to be addressed to a number of actuators can be grouped together under an alias.

It is also possible to envisage generating or modifying commands for the actuators directly in the computer 210. In particular, a certain number of events do not necessarily require the intervention of the high-level computer. Certain reflex functions notably can be directly driven in the card 20, notably the management of the balance of the robot or the avoidance of collisions between limbs. It is sufficient to implement the corresponding algorithm and a portion of the DCM on the card 20.

Figure 8:
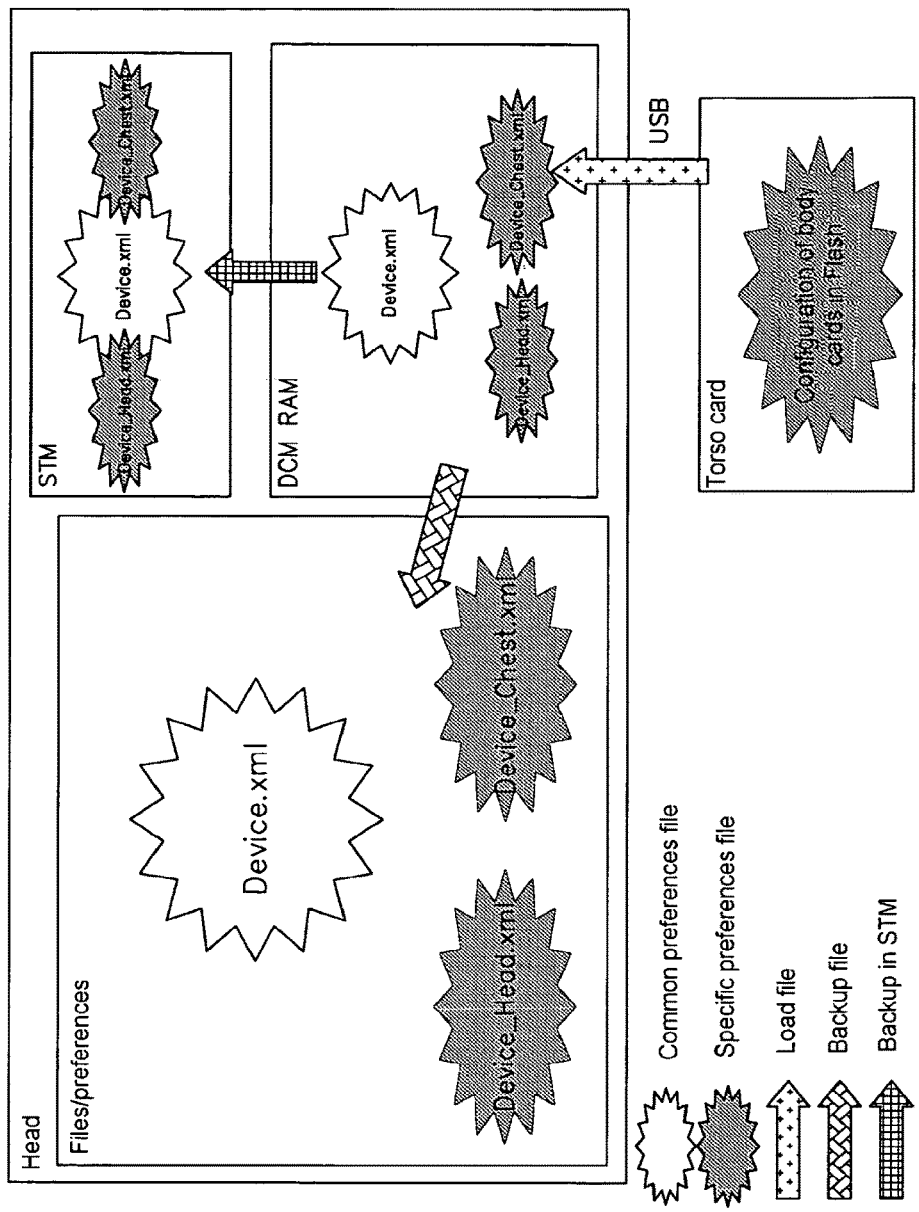
FIG. 8 is a schematic representation of the configuration file and sub-files that are linked to certain portions of the robot.

To provide a certain versatility for the robot, it is, moreover, necessary to provide files containing the hardware and software configurations that are easy to access and modify. The distribution of these configuration filed is illustrated by FIG. 8.

There are a Device.xml configuration file (preference) and a number of subfiles linked to certain portions of the robot (Device_Head.xml, Device_Chest.xml and others if necessary). Certain portions of the robot are interchangeable. The head can easily be separated from the body or be fitted back to it. Arms or other parts of the robot can also be replaced. This versatility is useful both for maintenance and, as already indicated, for adapting a robot to new missions or giving it a new personality or a new appearance. As it happens, there are calibration values associated with these parts that are essential for finely taking into account the specific implementation (calibration of the sensors of the articulations and of the LEDs, modifications made to adjust certain parameters after fitting, etc.). The best solution is not therefore to store these calibration values in head card files, which may risk having a poor calibration of the body should the head be exchanged. It is preferable to store in a file common to all the robots (Device.xml) only the default and uncalibrated values of the complete basic configuration in a key=value form. The values of the keys of this file are overwritten by 2 other files. The first is linked to the head, and is stored as a separate file (Device_Head.xml). It contains the calibration of all the SubDevices of the head (mainly LEDs). The chest card stores a file that is associated with all the body of the robot (Device_Chest.xml).

On start-up, the "chest config in flash" is read in the chest card and copied into the DCM's RAM and, in temporary file form, into the head's Preferences file system. The Device.xml values in the STM are overwritten.

The only reference is therefore the content of the chest card's flash memory. Thus, in case of head changes, the file of the chest card of the new body will therefore be read, eliminating any possible problem.

The examples described hereinabove are given to illustrate embodiments of the invention. They in no way limit the scope of the invention which is defined by the following claims.

The invention claimed is:

1. A mobile robot having articulated limbs, the robot comprising:
   a plurality of subsets of sensors and actuators, each subset being controlled by an electronic card, wherein a control function for at least one of the electronic cards is distributed between at least a first computer and a second computer,
   said first and second computers are each unique and located on-board said robot,
   said first computer is distinct from said second computer and also distinct from said at least one of the electronic cards controlling a subset of sensors and actuators, and
   said first computer transmits to said at least one of the electronic cards, command messages for executing functions defined by the second computer,
   said transmission being managed by a secure protocol on at least one specific bus, wherein said command messages are configured to cause said mobile robot to perform an action.

2. The mobile robot of claim 1, wherein the first computer and the electronic cards are also connected by two communication lines.

3. The mobile robot of claim 2, wherein one of the two communication lines is used to detect operation and the other communication line is used to assign addresses to said electronic cards.

4. The mobile robot of claim 1, wherein certain functions of the mobile robot are programmed in the first computer, said certain functions managing reflexes of the robot by determining commands for the actuators according to values of certain sensor state variables.

5. The mobile robot of claim 1, wherein certain configuration data of the mobile robot are stored in a memory managed by the first computer, and said configuration data comprises a list of electronic cards controlled, sensors and actuators commanded by said cards, and operating parameters of said sensors and actuators.

6. The mobile robot of claim 1, wherein the first computer manages an initialization procedure for at least one of the electronic cards of the robot.

7. The mobile robot of claim 1, further being configured so that the electronic cards of the robot can be replaced by an equivalent card without modifying the programming of either the first computer or the second computer.

8. The mobile robot of claim 1, further being configured so that the second computer can be replaced by another equivalent computer without modifying programming of the first computer.

9. The mobile robot of claim 1, wherein bytes of all of frames according to said secure protocol have a first byte at a value complementing a most significant bit of an address byte and a first byte in every seven bytes contains seven most significant bits of next seven bytes.

10. The mobile robot of claim 1, wherein said secure protocol includes a simulcast communication mode.

11. The mobile robot of claim 1, wherein the first computer and the at least one of the electronic cards that it controls are also connected by at least two communication lines, one of which is used to detect operation and the other to assign addresses to said electronic cards.

12. A method for controlling a mobile robot, the method comprising: transmitting a plurality of command steps for a plurality of subsets of sensors and actuators, wherein each said subset being controlled by an electronic card, wherein at least one of the plurality of command steps for subsets of sensors and actuators comprises a step of transmitting from a single first computer to at least one of the electronic cards command messages that are defined in a defining step that is executed on a second computer, wherein said single first computer and said single second computer are located on-board said robot and are separate and distinct from one another and from said electronic cards, said transmission being managed by a secure protocol on at least one specific bus, wherein said command messages are configured to cause said mobile robot to perform an action.

13. The method of claim 12, wherein the first computer and the electronic cards are also connected by two communication lines.

14. The method of claim 13, wherein one of the two communication lines is used to detect operation and the other communication line is used to assign addresses to said electronic cards.

15. The method of claim 12, wherein communication between the first computer and the at least one electronic card is managed by a secure protocol on at least one specific bus, wherein said secure protocol includes frames comprising, before bytes of the message, a byte containing at least a destination address and a most significant bit with a chosen value, and after the bytes of the message, at least one byte containing a size of the message and one byte containing a CRC.

16. The method of claim 15, wherein the bytes of all of the frames according to said secure protocol having a first byte at a value complementing a most significant bit of the address byte and the first bytes of every seven bytes contains the seven most significant bits of the next seven bytes.

17. The method of claim 12, wherein the step of transmitting command messages to at least one of the electronic cards is performed with a period that is of an order of magnitude of ten milliseconds.

18. The method of claim 17, wherein servo-control instructions executed by an electronic card between a first command and a second command are extrapolated from preceding commands by extending a command speed variation between a command preceding the first command and said first command.

19. The method of claim 17, wherein servo-control instructions executed by an electronic card between a first command and a second command are extrapolated from preceding commands by translating a command speed variation between a command preceding the first command and said first command to a servo-control instruction applied between the first and the second commands.

20. The method of claim 12, wherein the step of defining command messages includes the establishment of a definition of at least one execution date for each command message.

21. The method of claim 20, wherein time-stamped command values for defining an execution date are calculated by interpolation with periodic sending dates between values just before and values just after.

* * * * *